United States Patent
Yamaguchi (10) Patent No.: US 7,637,843 B2
(45) Date of Patent: Dec. 29, 2009

(54) CONTROL DEVICE FOR A CONTINUOUSLY VARIABLE TRANSMISSION AND CONTROL METHOD THEREOF

(75) Inventor: Toshiyasu Yamaguchi, Yamato (JP)

(73) Assignee: JATCO Ltd, Fuji-sji (JP)

( * ) Notice: Subject to any disclaimer, the term of this patent is extended or adjusted under 35 U.S.C. 154(b) by 445 days.

(21) Appl. No.: 11/702,563

(22) Filed: Feb. 6, 2007

(65) Prior Publication Data

US 2007/0219048 A1 Sep. 20, 2007

(30) Foreign Application Priority Data

Feb. 8, 2006 (JP) .............................. 2006-031104

(51) Int. Cl.
*F16H 61/662* (2006.01)
*B60W 10/04* (2006.01)
(52) U.S. Cl. ........................................ 477/44; 477/107
(58) Field of Classification Search .................. 477/44, 477/45, 46, 107, 112
See application file for complete search history.

(56) References Cited

U.S. PATENT DOCUMENTS

| 4,641,553 | A | * | 2/1987 | Kobayashi | 477/47 |
|---|---|---|---|---|---|
| 5,088,355 | A | * | 2/1992 | Sugaya et al. | 477/41 |
| 5,624,349 | A | | 4/1997 | Yamamoto | |
| 5,871,416 | A | * | 2/1999 | Sawada et al. | 477/47 |
| 6,908,412 | B2 | | 6/2005 | Kurabayashi | |
| 2004/0063538 | A1 | * | 4/2004 | Yamamoto et al. | 477/45 |

FOREIGN PATENT DOCUMENTS

| JP | 8-178063 A | 7/1996 |
|---|---|---|
| JP | 2001-173776 A | 6/2001 |
| JP | 2003-074682 A | 3/2003 |

* cited by examiner

*Primary Examiner*—Roger Pang
(74) *Attorney, Agent, or Firm*—Foley & Lardner LLP (57) ABSTRACT

In a control device for a continuously variable transmission comprising a controller for controlling the speed ratio of a belt continuously variable transmission via an actuator, the continuously variable transmission is capable of selecting a first speed ratio i1 corresponding to a biggest speed ratio and a second speed ratio i2 that is smaller than the first speed ratio as a startup speed ratio. The controller switch the second speed ratio to the first speed ratio when the rotation speed of a primary side pulley falls to a predetermined rotation speed Nt during vehicle deceleration, even if the second speed ratio has been selected, and switches the first speed ratio to the second speed ratio when the rotation speed of the primary side pulley rises to the predetermined rotation speed during vehicle startup.

9 Claims, 7 Drawing Sheets

FIG.7 ific field of the invention

CONTROL DEVICE FOR A CONTINUOUSLY VARIABLE TRANSMISSION AND CONTROL METHOD THEREOF

TECHNICAL FIELD OF THE INVENTION

This invention relates to a control device for a continuously variable transmission, and more particularly to a control device used during vehicle startup and stopping.

BACKGROUND OF THE INVENTION

Conventional continuously variable transmissions used in vehicles include a belt continuously variable transmission and a toroidal continuously variable transmission. A speed change control device for such a continuously variable transmission determines a target speed ratio or a target input shaft rotation speed in accordance with a vehicle speed VSP and a throttle opening TVO (or an accelerator pedal stroke) (see Japanese Unexamined Patent Application Publication JP8-178063A).

In this case, initialization processing is performed to determine a starting position of a step motor for driving a speed change control valve, and when an ignition switch switches ON, the step motor is driven to the starting position at a predetermined speed, whereupon normal speed change control is performed. Speed change control is begun using as the starting position a position in which a rod of a spool provided in the speed change control valve contacts a stopper, for example.

SUMMARY OF THE INVENTION

Meanwhile, to improve the salability of vehicles, in recent years a technique of providing two types of speed change line for selection during startup of the continuously variable transmission has been employed, the two speed change lines being selectable during on road running and off road running, for example. Typically in this case, the speed change line for off road running is set at the biggest speed ratio, and the speed change line for on road running is set on a higher speed side than the speed change line for off road running.

When apply a continuously variable transmission having two startup speed change lines to the prior art, if the vehicle stops after running along the speed change line for on road running and then restarts, first the step motor is initialized, then the speed change line is switched to the biggest speed change line for off road running corresponding to the starting position of the step motor, then the speed change line is switched to the speed change line for on road running, and only then does the vehicle start. When the vehicle is started up along the speed change line for on road running, the step motor is subjected to feedforward control, and as a result it is difficult to control the speed ratio precisely.

This invention has been established in consideration of above problems, and it is an object thereof to provide a speed change control device for a vehicle which employs a step motor, in which startup and stopping are performed smoothly irrespective of the selected speed change line when two startup speed change lines are provided.

In this invention, when the rotation speed of the primary side pulley falls to or below the predetermined rotation speed, the speed ratio is switched to the first speed ratio, at which the actuator reaches the starting position, even if the second speed ratio has been selected, and as a result, speed change control during startup can be performed with a high level of precision.

In order to achieve above the object, this invention provides a control device for a continuously variable transmission, the continuously variable transmission having a pair of variable pulleys constituted by a primary side pulley and a secondary side pulley, in which a contact pulley width of a V belt is variably controlled on the basis of an oil pressure, and having a first speed ratio corresponding to the biggest speed ratio and a second speed ratio that is smaller than the first speed ratio as a startup speed ratio, the control device comprising: a speed change control valve which supplies the variable pulleys with the oil pressure; an actuator which drives the speed change control valve in accordance with a target speed ratio, and have a starting position of which is set at a position in which a speed ratio of the continuously variable transmission reaches a biggest speed ratio; a controller for controlling the speed ratio via the actuator; a shift lever position detecting switch for detecting a position of a shift lever of the continuously variable transmission; and a primary side pulley rotation speed sensor for detecting a rotation speed of the primary side pulley; wherein the controller switches the speed ratio from the second speed ratio to the first speed ratio, when the shift lever position of the continuously variable transmission is in a position for selecting the second speed ratio, vehicle deceleration is underway, and the rotation speed of the primary side pulley falls to a predetermined rotation speed; switches the speed ratio from the first speed ratio to the second speed ratio, when the shift lever position of the continuously variable transmission is in a position for selecting the second speed ratio, vehicle startup is underway, and the rotation speed of the primary side pulley rises to the predetermined rotation speed; and controls the actuator in accordance with the switched speed ratio, and controls the actuator in accordance with the switched speed ratio.

DETAILED DESCRIPTION OF THE PREFERRED EMBODIMENT

An embodiment of this invention is described in further detail below with reference to the drawings and so on.

Figure 1:
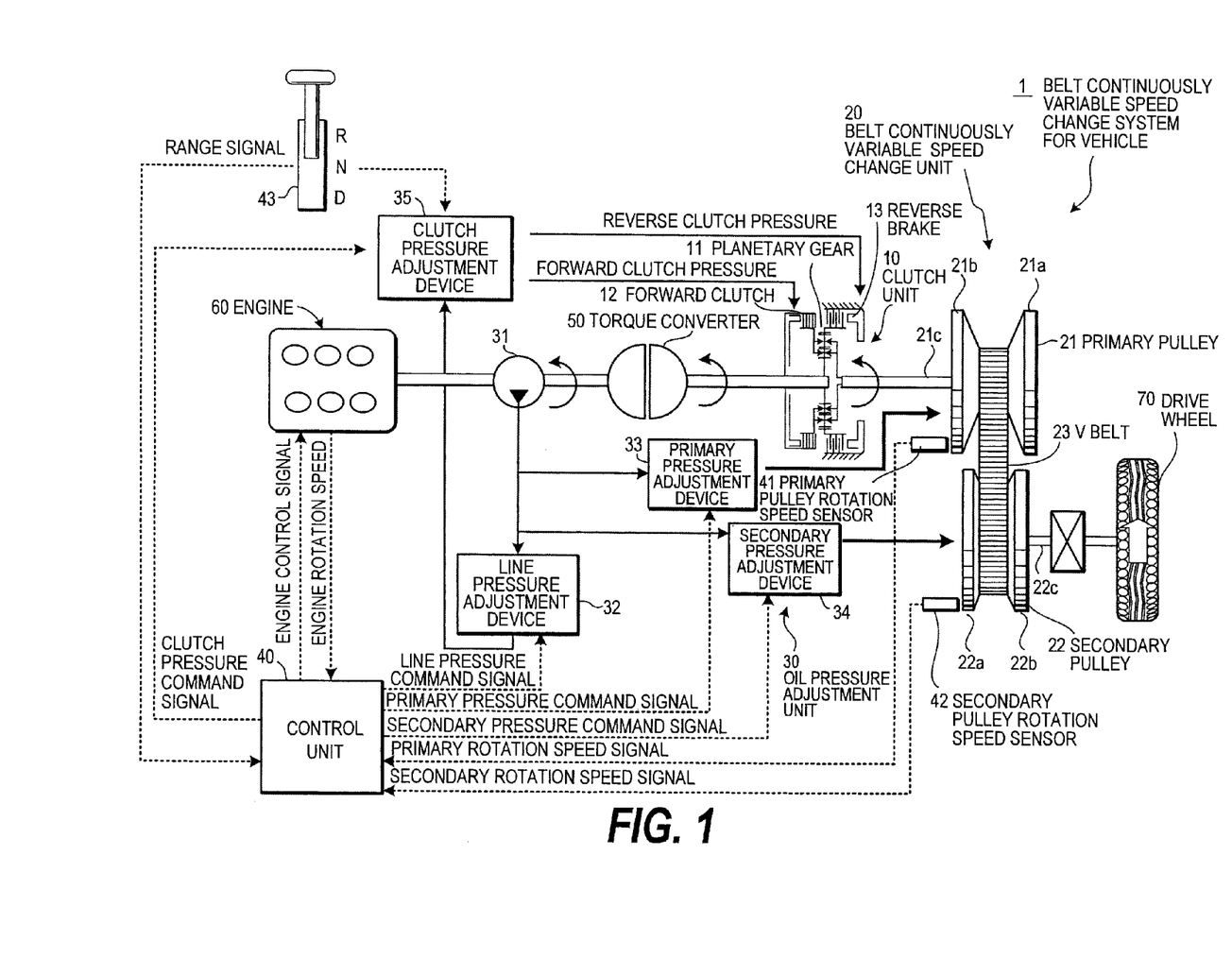
FIG. 1 is a schematic drawing showing a belt continuously variable speed change system for a vehicle according to this invention.

FIG. 1 is a schematic drawing showing a belt continuously variable speed change system for a vehicle, according to this invention.

A belt continuously variable speed change system for a vehicle 1 comprises a clutch unit 10, a belt continuously variable speed change unit 20, an oil pressure adjustment unit 30, and a control unit 40, and transmits the rotation of an engine 60 to a drive wheel 70 at a reduced speed. In the belt continuously variable speed change system for a vehicle 1 according to this embodiment, a torque converter 50 is provided between the engine 60 and clutch unit 10. The torque converter 50 is a device for transmitting the rotary torque of the engine 60 in accordance with an oil flow in its interior, and comprises a so-called lockup mechanism.

Assuming that an engine rotation speed is Ne, a torque converter capacity coefficient is $\tau$, and a torque converter torque ratio is t, an input torque $T_{in}$ input into the torque converter 50 and an output torque $T_{out}$ output from the torque converter 50 are expressed respectively as follows.

$$T_{in} = \tau \times Ne^2$$

$$T_{out} = \tau \times Ne^2 \times t$$

Thus, the transmission torque of the torque converter 50 is determined by the engine rotation speed.

The clutch unit 10 comprises a planetary gear 11 for switching a power transmission path between the engine 60 side and a primary pulley 21 side, a forward clutch 12, and a reverse brake 13. Using oil pressure supplied by a clutch pressure adjustment device 35, the clutch unit 10 engages the forward clutch 12 when the vehicle runs forward, engages the reverse brake 13 when the vehicle runs backward, and disengages both the forward clutch 12 and the reverse brake 13 in a neutral position (neutral or parking). The clutch pressure adjustment device 35 controls the engagement state by adjusting the oil pressure (forward clutch pressure, reverse clutch pressure) supplied to the forward clutch 12 and reverse brake 13 in accordance with a command from the control unit 40.

The forward clutch 12 and reverse brake 13 are engaged exclusively during advancement (range signal=D range), the forward clutch 12 is engaged by supplying the forward clutch pressure and the reverse brake 13 is disengaged by connecting the reverse clutch pressure to a drain. During reversing (range signal=R range), on the other hand, the forward clutch pressure is connected to the drain such that the forward clutch 12 is disengaged, and the reverse clutch pressure is supplied to engage the reverse brake 13. In the neutral position (range signal=N range), both the forward clutch pressure and reverse clutch pressure are connected to the drain, and thus both the forward clutch 12 and reverse brake 13 are disengaged.

The belt continuously variable speed change unit 20 comprises the primary pulley 21, a secondary pulley 22, and a V belt 23.

The primary pulley 21 is an input shaft side pulley for inputting the rotation of the engine 60. The primary pulley 21 comprises a fixed conical plate 21a which rotates integrally with an input shaft 21c, and a movable conical plate 21b which is disposed opposite the fixed conical plate 21a to form a V-shaped pulley groove, and which can be displaced axially by oil pressure (to be referred to as "primary pressure" hereafter) acting on the primary pulley. The rotation speed of the primary pulley 21 is detected by a primary pulley rotation speed sensor 41, and the torque input into the primary pulley 21 is detected by a torque sensor, not shown in the figure.

The secondary pulley 22 transmits the rotation transmitted by the V belt 23 to the drive wheel 70 via an idler gear and a differential gear. The secondary pulley 22 comprises a fixed conical plate 22a which rotates integrally with an output shaft 22c, and a movable conical plate 22b which is disposed opposite the fixed conical plate 22a to form a V-shaped pulley groove, and which can be displaced axially in accordance with oil pressure (to be referred to as "secondary pressure" hereafter) acting on the secondary pulley 22. It should be noted that the pressure-receiving surface area of the secondary pulley 22 and the pressure-receiving surface area of the primary pulley 21 are set to be equal or substantially equal. The rotation speed of the secondary pulley 22 is detected by a secondary pulley rotation speed sensor 42. The vehicle speed is calculated from the rotation speed of the secondary pulley 22.

The V belt 23 is wrapped around the primary pulley 21 and secondary pulley 22 such that the rotation of the primary pulley 21 is transmitted to the secondary pulley 22.

The oil pressure adjustment unit 30 comprises a hydraulic pump 31, a line pressure adjustment device 32, a primary pressure adjustment device 33, a secondary pressure adjustment device 34, and the clutch pressure adjustment device 35.

The hydraulic pump 31 is connected to the input side of the clutch unit 10 and so on, and is driven by the engine 60 to pump oil.

The line pressure adjustment device 32 adjusts the pressure of the oil pumped by the hydraulic pump 31 to a predetermined line pressure PL corresponding to driving conditions in accordance with a command (a duty signal or the like, for example) from the control unit 40.

Figure 2:
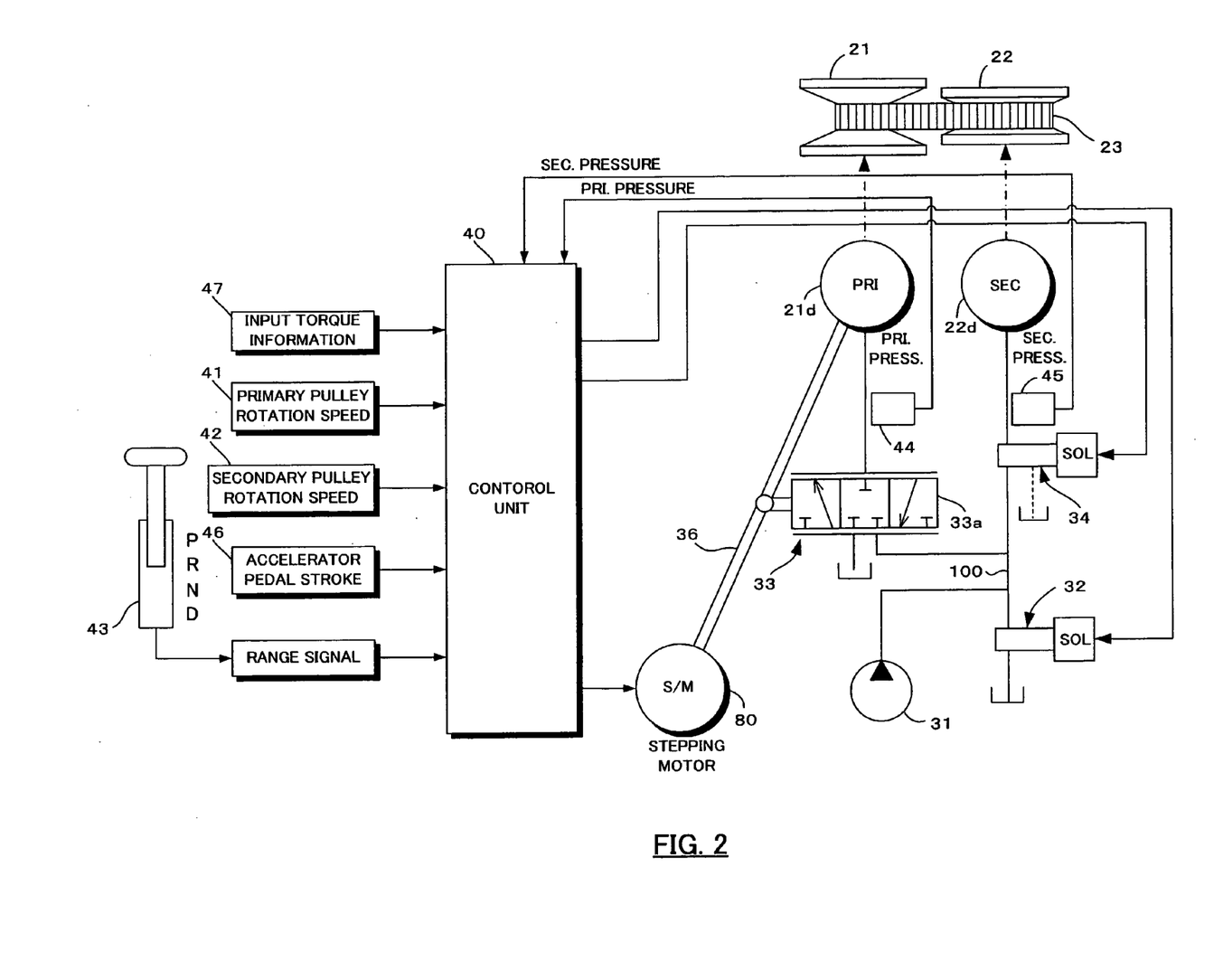
FIG. 2 is a view illustrating a speed change mechanism of a belt continuously variable speed change unit in detail.

The primary pressure adjustment device 33 is a device for controlling the primary pressure, which is constituted by a solenoid, a servo link 36 constituting a mechanical feedback mechanism, a step motor 80, and so on, as shown in FIG. 2.

The secondary pressure adjustment device 34 is controlled in accordance with a command from the control unit 40 to further reduce the line pressure PL adjusted by the line pressure adjustment device 32 to a predetermined secondary pressure corresponding to driving conditions.

The clutch pressure adjustment device 35 adjusts the forward clutch pressure and reverse clutch pressure using the oil pressure from the hydraulic pump 31 as a source pressure. The clutch pressure adjustment device 35 engages and disengages the forward clutch 12 and reverse brake 13 by adjusting the forward clutch pressure and reverse clutch pressure in accordance with an oil pressure command value from the control unit 40.

The control unit 40 determines the oil pressure command value on the basis of driving conditions and driving operations such as a vehicle speed signal from the secondary pulley rotation speed sensor 42, a range signal from an inhibitor switch 43 which operates in conjunction with a shift lever, and an engine rotation speed signal from the engine 60 (or engine control device), and transmits a command to the clutch pressure adjustment device 35. It should be noted that in this example, the inhibitor switch 43 selects one of advancement (D range), a neutral position=neutral (N range), and reverse (R range).

The control unit 40 controls the clutch pressure adjustment device 35 to adjust the oil pressure supplied to the forward clutch 12 and reverse brake 13, and controls the forward clutch pressure and reverse clutch pressure to control the engagement state of the clutches. The control unit 40 controls the engagement state of a lockup clutch provided in the lockup mechanism, not shown in the figure, which is provided in the torque converter 50.

The control unit 40 also determines a target speed ratio by reading input torque information of the engine 60 and signals relating to the input torque of the primary pulley 21, the ratio between the rotation speed of the primary pulley 21 and the rotation speed of the secondary pulley 22 (the speed ratio=the rotation speed of the primary pulley 21/the rotation speed of the secondary pulley 22), a select position from the inhibitor switch 43, the vehicle speed (the secondary pulley rotation speed), the accelerator pedal stroke, the oil temperature, the oil pressure, and so on, and calculates a target primary pressure and a target secondary pressure for realizing the target speed ratio. If necessary, the control unit 40 corrects the target pressure, and to realize the target pressure, the control unit 40 controls the line pressure adjustment device 32, primary pressure adjustment device 33, and secondary pressure adjustment device 34 to adjust the oil pressure that is supplied to the primary pulley 21 and secondary pulley 22. As a result, the movable conical plate 21b and the movable conical plate 22b are caused to reciprocate in a rotary axis direction, thereby varying the pulley groove width of the primary pulley 21 and secondary pulley 22. The V belt 23 then moves over the primary pulley 21 and secondary pulley 22 such that the radius of contact between the V belt 23 and the primary pulley 21 and secondary pulley 22 changes, and thus the speed ratio is controlled.

The rotation of the engine 60 is input into the belt continuously variable speed change unit 20 via the torque converter 50 and clutch unit 10, and transmitted from the primary pulley 21 to the drive wheel 70 via the V belt 23 and secondary pulley 22.

When the accelerator pedal is depressed or a shift change is performed in a manual mode, the control unit 40 axially displaces the movable conical plate 21b of the primary pulley 21 and the movable conical plate 22b of the secondary pulley 22, thereby altering the contact radius thereof with the V belt 23 such that the speed ratio is varied continuously to the target speed ratio.

The control unit 40 also controls the engine torque and rotation speed by controlling a fuel injection amount and a throttle opening of the engine 60.

FIG. 2 is a view illustrating in detail a speed change mechanism of the belt continuously variable speed change unit 20 to which this invention is applied.

As described above, the belt continuously variable speed change unit 20 comprises the input shaft side primary pulley 21 and the output shaft side secondary pulley 22 serving as a pair of variable pulleys, and this pair of variable pulleys 21, 22 is connected by the V belt 23.

The speed ratio of the belt continuously variable speed change unit 20 and the contact frictional force of the V belt 23 are controlled by a hydraulic control circuit which operates in response to a command from the control unit 40. The control unit 40 determines the speed ratio and contact frictional force and controls the oil pressure on the basis of the input torque information and output from sensors and the like to be described below.

The primary pulley 21 variably controls the groove width on either side of the V belt 23 in accordance with the oil pressure (primary pressure) acting on a primary pulley cylinder chamber 21d. The secondary pulley 22 variably controls the groove width on either side of the V belt 23 in accordance with the oil pressure (secondary pressure) acting on a secondary pulley cylinder chamber 22d.

The hydraulic control circuit which controls the speed ratio of the belt continuously variable speed change unit 20 and the contact frictional force of the V belt 23 is mainly constituted by the line pressure adjustment device 32 for controlling the line pressure PL, the primary pressure adjustment device 33 for controlling the oil pressure of the primary pulley cylinder chamber 21d (primary pressure hereafter), and the secondary pressure adjustment device 34 for controlling the pressure supplied to the secondary pulley cylinder chamber 22d (secondary pressure hereafter).

The primary pressure adjustment device 33 is connected to the servo link 36, which constitutes the mechanical feedback mechanism. The primary pressure adjustment device 33 is driven by the step motor 80, which is connected to one end of the servo link 36, and receives feedback regarding the groove width, or in other words the actual speed ratio, from a movable conical plate (not shown) of the primary pulley 21, which is connected to the other end of the servo link 36.

A line pressure control system comprises the line pressure adjustment device 32, which is constituted by a two-way linear solenoid valve for adjusting pressure oil pumped by the hydraulic pump 31, and adjusts the line pressure to a predetermined line pressure PL corresponding to driving conditions in accordance with a command (a duty signal or the like, for example) from the control unit 40.

The line pressure PL is supplied to the primary pressure adjustment device 33 for adjusting the primary pressure and the secondary pressure adjustment device 34, which comprises a solenoid for controlling the secondary pressure, respectively.

The speed ratio of the primary pulley 21 and secondary pulley 22 is controlled by the step motor 80, which is driven in accordance with a speed change command signal from the control unit 40. More specifically, a spool 33a of the primary pressure adjustment device 33 is driven in accordance with displacement of the servo link 36, which operates in conjunction with the step motor 80, and as a result, the line pressure PL supplied to the primary pressure adjustment device 33 is adjusted, and the primary pressure is supplied to the primary pulley 21. Thus, the groove width is variably controlled to a predetermined speed ratio.

The primary pressure adjustment device 33 adjusts the primary pressure to realize the target speed ratio commanded by the drive position of the step motor 80 by taking in and discharging the oil pressure into/from the primary pulley cylinder chamber 21d in accordance with the displacement of the spool 33a, and when an actual speed change operation is complete, the primary pressure adjustment device 33 receives the displacement of the servo link 36 so as to close the spool 33a. It should be noted that a position in which a rod of the spool 33a provided in the primary pressure adjustment device 33 contacts a stopper serves as a starting position, and the speed ratio of the belt continuously variable speed change unit 20 is set at the biggest speed ratio in the starting position.

Here, the control unit 40 reads the oil temperature of the belt continuously variable speed change unit 20 from a signal from the primary pulley speed sensor 41, which detects the rotation speed of the primary pulley 21, a signal from the secondary pulley speed sensor 42, which detects the rotation speed of the secondary pulley 22 (or the vehicle speed), a range signal from the inhibitor switch 43, which operates in conjunction with the select lever, a signal from an oil pressure sensor 44 which detects the primary pressure acting on the primary pulley cylinder chamber 21d, a signal from an oil pressure sensor 45 which detects the secondary pressure acting on the secondary pulley cylinder chamber 22d, and a stroke (or a throttle valve opening) from an operation amount sensor 46 corresponding to an operation amount of an accelerator pedal operated by a driver, and variably controls the speed ratio and the contact frictional force of the V belt 23.

During normal control by the control unit 40, the target speed ratio is determined in accordance with the vehicle and the accelerator pedal stroke, whereupon the step motor 80 is driven to control the actual speed ratio toward the target speed ratio. Pulley pressure (oil pressure) control is also performed to control the thrust (contact frictional force) of the primary pulley 21 and secondary pulley 22 in accordance with the input torque, the speed ratio, the oil temperature, the shift speed, and so on.

Next, using the speed change line diagram in FIG. 3, the speed change control that is implemented by the control unit 40 will be described.

Figure 3:
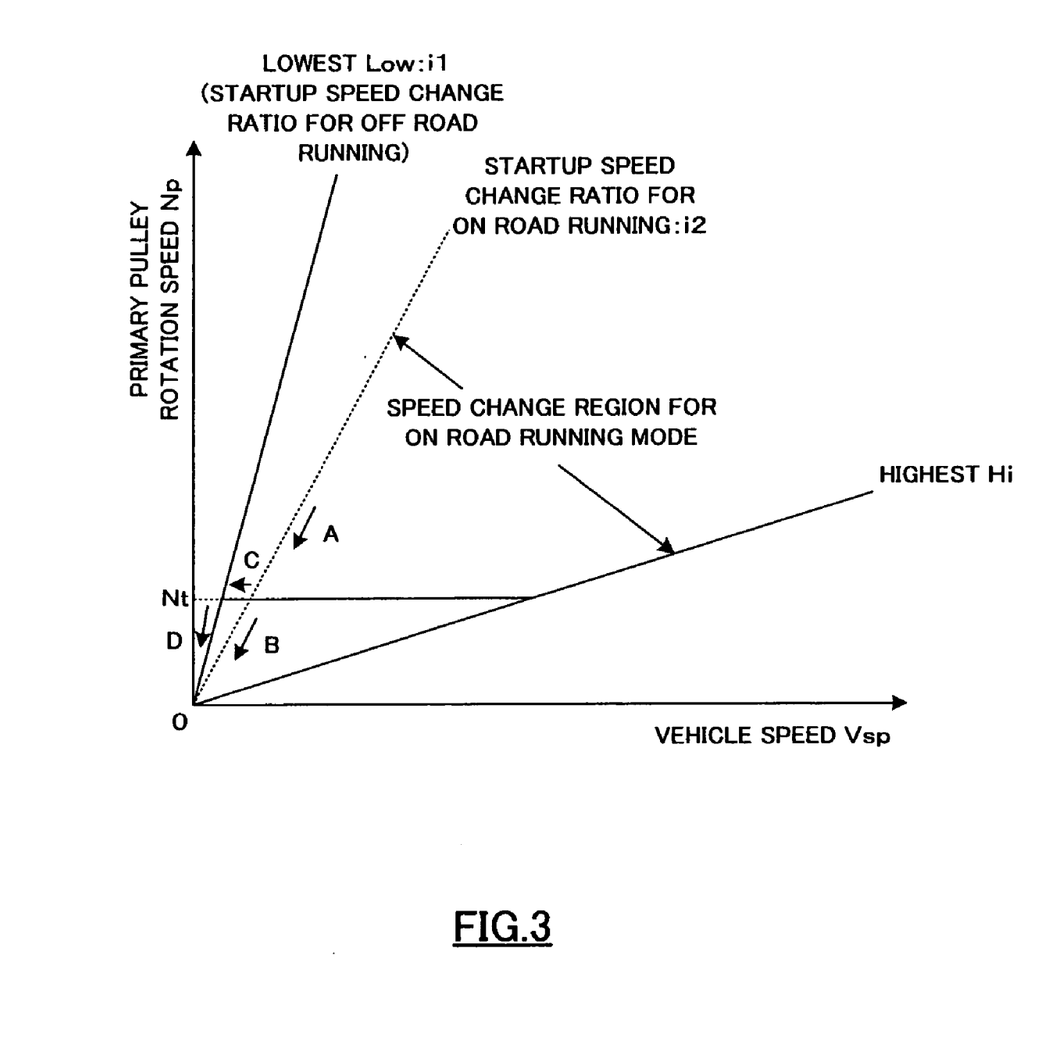
FIG. 3 is a speed change line diagram illustrating speed change control.

FIG. 3 shows the speed change lines of the continuously variable speed change unit 20, the ordinate showing a primary pulley rotation speed Np and the abscissa showing a vehicle speed Vsp. The continuously variable speed change unit 20 to which this invention is applied comprises a plurality of different startup speed ratios including an off road running startup speed ratio (to be referred to as an off road startup speed ratio hereafter) i1 and an on road running startup speed ratio (to be referred to as an on road startup speed ratio hereafter) i2, for example.

As shown in FIG. 3, the on road startup speed ratio i2 is set lower than the off road startup speed ratio i1 (i1>i2). When an attempt is made to stop the vehicle having selected the on road startup speed ratio i2, which is the biggest speed ratio of on road running, the vehicle speed Vsp decreases while maintaining the on road startup speed ratio i2 (A, B in the figure).

The starting position of the step motor 80 for varying the speed ratio ip of the continuously variable speed change unit 20 is typically set in a position at which movement is mechanically impossible, for example a position in which the rod of the spool 33a in the primary pressure adjustment device 33 contacts the stopper, as described above, and this position corresponds to the biggest speed change line of all possible speed change lines, which in this embodiment is the off road startup speed ratio i1.

Hence, the position of the step motor 80 corresponding to the on road startup speed ratio i2 is not the starting position, and therefore, when running at an extremely low speed or the like, the speed ratio ip of the continuously variable speed change unit 20 cannot be read accurately, and the control system response varies greatly, making feedback control impossible. As a result, feedforward control is performed, and therefore speed change control cannot be performed accurately.

In this embodiment, when the rotation speed Np of the primary pulley 21 reaches a predetermined rotation speed Nt at the on road startup speed ratio i2 as the vehicle stops from a state of on road running, the desired on road startup speed ratio i2 is switched to the off road startup speed ratio i1 corresponding to the starting position of the step motor (C in FIG. 3), whereupon the vehicle is stopped (D).

On the other hand, during startup from a state in which the on road running startup speed ratio i2 has been selected, startup is performed initially at the off road startup speed ratio i1, which is the biggest speed ratio, and when the rotation speed Np of the primary pulley 21 reaches the predetermined rotation speed Nt, the off road startup speed ratio i1 is switched to the on road startup speed ratio i2.

Here, the predetermined rotation speed Nt is set at a primary pulley rotation speed Np that enables feedback control, for example.

Through this control, the step motor 80 always returns to the starting position when the vehicle starts and stops, and hence a situation such as that described above, in which feedback control cannot be performed and the precision of speed change control decreases, can be prevented.

Figure 4:
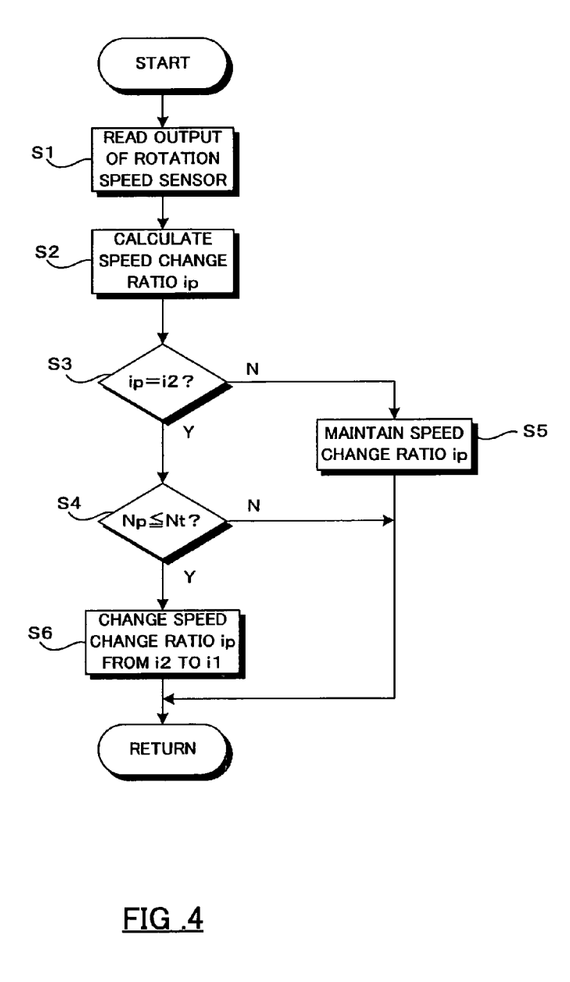
FIG. 4 is a flowchart for determining whether or not to shift to a speed ratio i1 that is lower than a desired speed ratio i2.

FIG. 4 is a flowchart for determining whether or not to shift to the off road startup speed ratio i1, which is bigger than the desired on road startup speed ratio i2, when the vehicle decelerates. This control is implemented by the control unit 40 at predetermined intervals.

First, the current speed ratio (=pulley ratio) ip of the belt continuously variable speed change unit 20 is calculated. To calculate the speed ratio ip in a step S1, the output values of the rotation speed sensors 41, 42 for detecting the rotation speeds of the primary pulley 21 and secondary pulley 22 are read. Next, in a step S2, the speed ratio ip is calculated from the output values of the rotation speed sensors 41, 42. Next, in a step S3, a determination is made as to whether or not the calculated speed ratio ip is the on road startup speed ratio i2.

When the determination condition is established, the routine advances to a step S4, and when the determination condition is not established, or in other words when the calculated speed ratio ip is not the on road startup speed ratio i2, the routine advances to a step S5, where the current speed ratio ip is maintained and the control is terminated.

In the step S4, a determination is made as to whether or not the read rotation speed Np of the primary pulley 21 is equal to or lower than the predetermined rotation speed Nt. When the primary pulley rotation speed Np is equal to or lower than the predetermined rotation speed Nt, the routine advances to a step S6, where the speed ratio ip is switched to the off road startup speed ratio i1 and the vehicle is stopped. When the primary pulley rotation speed Np exceeds the predetermined rotation speed Nt, the current on road startup speed ratio i2 is maintained.

During vehicle startup, startup is performed initially at the off road startup speed ratio i1, even if the driver selects the on road startup speed ratio i2. A determination is then made as to whether or not the primary pulley rotation speed Np has reached the predetermined rotation speed Nt, and if so, control is performed to switch the speed ratio ip to the on road startup speed ratio i2.

Thus, during stopping or startup, the speed ratio is modified to the off road startup speed ratio i1 even when the driver has selected the on road startup speed ratio i2. As a result, the step motor 80 always returns to the starting position when the vehicle stops, thereby preventing a reduction in the precision of speed change control.

As a result, however, the vehicle travels at the off road startup speed ratio i1, which is bigger than the on road startup speed ratio i2, at or below the predetermined rotation speed Nt, and therefore the driving force increases such that during startup, acceleration is greater than the driver anticipates. In this embodiment, this problem is overcome by limiting the output torque of the engine 60.

Figure 5:
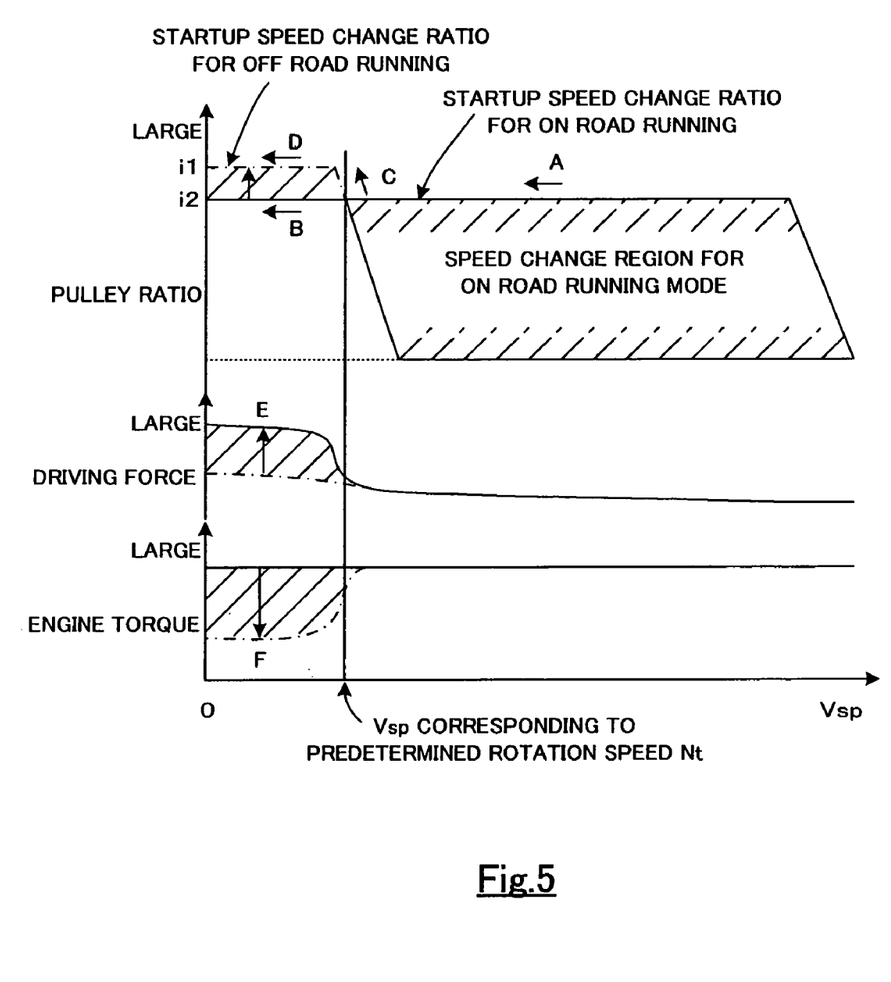
FIG. 5 is a view illustrating limitation of an output torque of an engine.

FIG. 5 is a view illustrating limitation of the output torque of the engine 60.

When the vehicle has decelerated at the on road startup speed ratio i2 so as to reach a vehicle speed corresponding to the predetermined rotation speed Nt of the primary pulley 21, the on road startup speed ratio i2 switches to the off road startup speed ratio i1, which is a bigger speed ratio (A→C→D). As a result, the off road startup speed ratio i1, which is bigger than the desired on road startup speed ratio i2, is selected, leading to an increase in driving force (E in the figure). To suppress this increase in driving force, the output torque of the engine 60 is reduced (F), thereby preventing unintended acceleration during startup and ensuring stability.

Next, limitation of the output torque of the engine 60 when the speed ratio ip is modified to the off road startup speed ratio i1 after the driver has selected the on road startup speed ratio i2 will be described. This control is implemented by the control unit 40.

Figure 6:
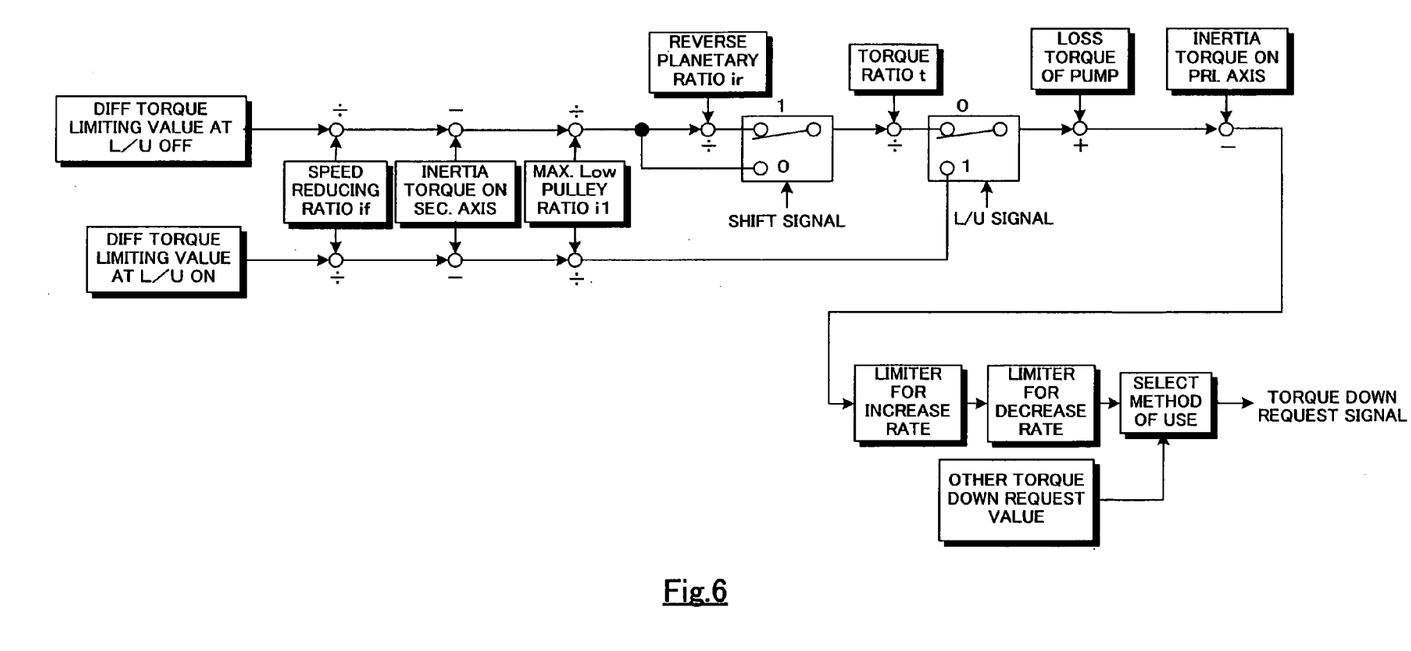
FIG. 6 is a block diagram illustrating a method of converting an input torque of a primary pulley into the output torque of the engine.

The block diagram shown in FIG. 6 illustrates calculation of the output torque of the engine 60 when the speed ratio ip is modified to the off road startup speed ratio i1 after the driver has selected the on road startup speed ratio i2.

Figure 7:
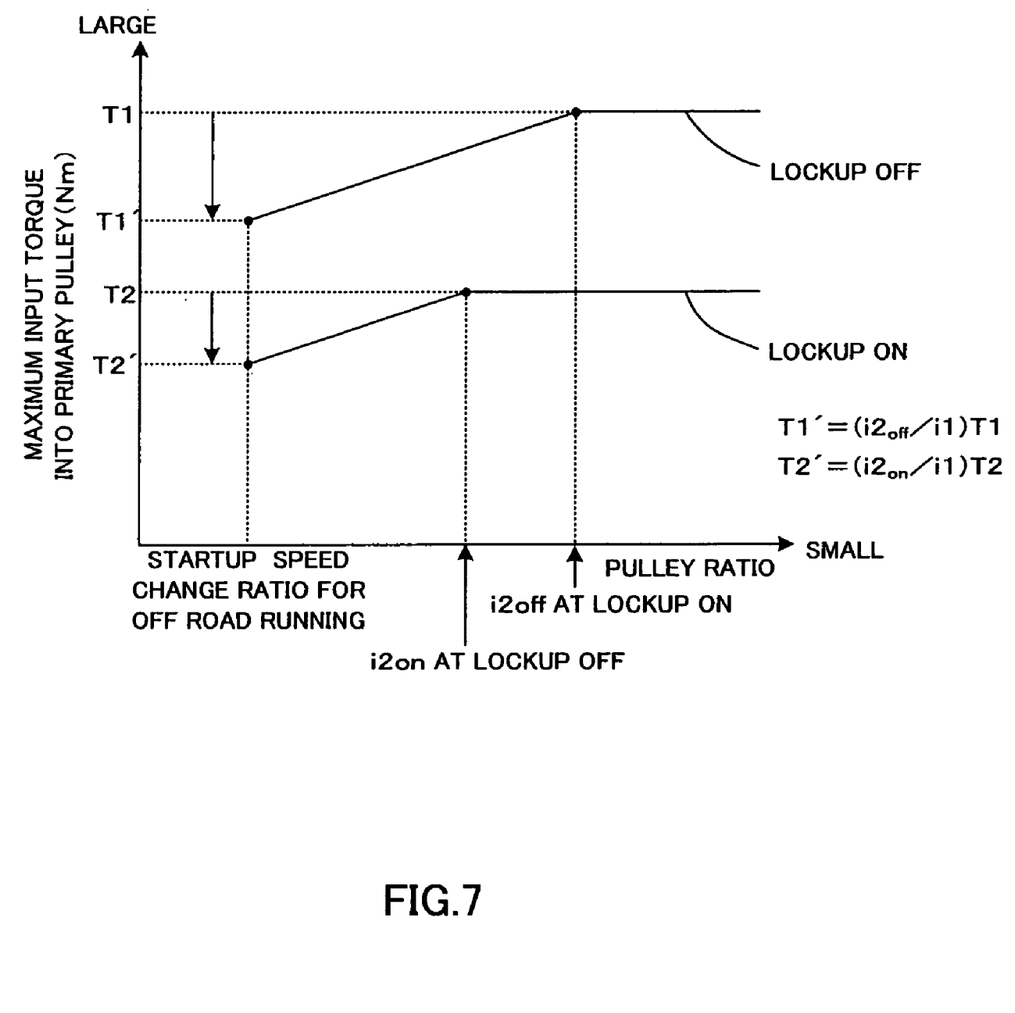
FIG. 7 is a view illustrating a relationship between a speed ratio ip and a maximum value of the input torque of the primary pulley.

FIG. 7 is a view illustrating the relationship between the speed ratio ip and a maximum value of the input torque of the primary pulley 21.

First, referring to FIG. 7, the torque that is input into the primary pulley 21 differs depending on whether or not the lockup clutch is engaged. The input torque when the lockup clutch is disengaged (lockup OFF) is greater than the input torque when the lockup clutch is engaged (lockup ON) by an amount corresponding to the torque amplification action of the torque converter.

The maximum input torque of the primary pulley 21 at the on road startup speed ratio i2, which differs according to the ON/OFF state of the lockup clutch, decreases in accordance with the off road startup speed ratio i1. More specifically, during lockup ON, for example, the maximum torque of the primary pulley 21 at the on road startup speed ratio i2 is T2 (Nm), while the maximum torque at the off road startup speed ratio i1 reduces the output torque of the engine to T2' (Nm), and the increase in driving force corresponding to the increase in the speed ratio is canceled out by limiting the output torque of the engine 60. This is similar during lockup OFF. The reduced torque is set in converting the reduced torque into the output of the engine 60 is illustrated in FIG. 6.

First in FIG. 6, a maximum input torque (torque limiting value) of the differential gear, corresponding to the maximum input torque T1', T2' of the primary pulley 21 illustrated in FIG. 7, is input for each lockup state. In the figure, L/U denotes lockup.

With respect to a state of lockup OFF, the input torque limiting value of the differential gear during lockup OFF is divided by a speed reducing ratio if of the differential gear, whereupon the torque limiting value is further corrected by subtracting inertia torque on the axis of the secondary pulley 22 therefore.

The inertia torque on the axis of the secondary pulley 22 is calculated using the following equations.

1. When the rotation speed of the secondary pulley 22 is increasing (rotation speed rate of change ΔOutREV>0).

Inertia torque $s1=|\Delta OutREV|\times(-\text{inertia coefficient } s1)$

2. When the rotation speed of the secondary pulley 22 is decreasing (rotation speed rate of change ΔOutREV≦0).

Inertia torque $s2=|\Delta OutREV|\times(-\text{inertia coefficient } s2)$

Here, the inertia coefficients s1, s2 are constants set in accordance with the inertia of constitutional components to which drive torque is transmitted on its way from the drive wheel 70 to the secondary pulley 22 of the continuously variable speed change unit 20.

One of the inertia torque values is subtracted from the corrected torque limiting value in accordance with variation in the rotation speed of the secondary pulley 22.

The corrected torque limiting value is then divided by the off road startup speed ratio i1, whereupon a determination is made as to whether or not the vehicle is advancing or reversing by reading the output signal of the inhibitor switch 43. When the vehicle is reversing, the corrected torque limiting value is divided by a reverse gear ratio ir, and when the vehicle is advancing, the corrected torque limiting value is maintained.

The torque limiting value set in this manner is corrected by being divided by the torque ratio t of the torque converter 50.

Next, a control signal indicating the engagement state of the lockup clutch is read, and on the basis of the control signal, either the torque limiting value based on the lockup ON state or the torque limiting value based on the lockup OFF state is selected.

In relation to the torque limiting value based on the lockup OFF state, described heretofore, the torque limiting value based on the lockup ON state is a torque limiting value that is corrected by the speed reducing ratio, the inertia on the axis of the secondary pulley 22, and the off road startup speed ratio i1 using the maximum input torque (torque limiting value) of the differential gear, which corresponds to the maximum input torque of the primary pulley 21 during lockup ON, as input.

The torque limiting value selected in accordance with the lockup state is further corrected by loss torque of the hydraulic pump 31. More specifically, the loss torque of the hydraulic pump 31 is added to the torque limiting value. Next, the torque limiting value is corrected by the inertia torque on the axis of the primary pulley 21. This inertia torque is calculated similarly to the inertia torque on the axis of the secondary pulley 22, described above, using the following equations, and the set inertia torque is subtracted from the torque limiting value.

The inertia torque on the axis of the primary pulley 21 is calculated using the following equations.

1. When the rotation speed of the primary pulley 21 is increasing (rotation speed rate of change ΔInpREV>0).

Inertia torque $s1=|\Delta InpREV|\times(-\text{inertia coefficient } s3)$

2. When the rotation speed of the primary pulley 21 is decreasing (rotation speed rate of change ΔInpREV≦0).

Inertia torque $s2=|\Delta InpREV|\times(-\text{inertia coefficient } s4)$

Here, the inertia coefficients s3, s4 are constants set in accordance with the inertia of constitutional components to which drive torque is transmitted on its way from the drive wheel 70 to the primary pulley 21 of the continuously variable speed change unit 20.

Next, a filter is applied to ensure that the change in the torque limiting value, corrected as described above, stays within a predetermined range, whereupon the torque limiting value is compared to a torque limiting value based on other requirements, and the smaller thereof is selected.

The control unit 40 then controls the output torque of the engine 60 such that the output torque of the engine 60 corresponds to the torque limiting value at the differential gear, which is set in the manner described above.

The invention described above is a control device for a continuously variable transmission, the continuously variable transmission having a pair of variable pulleys constituted by a primary side pulley and a secondary side pulley, in which a contact pulley width of a V belt is variably controlled on the basis of an oil pressure, and having a first speed ratio corresponding to the biggest speed ratio and a second speed ratio that is smaller than the first speed ratio as a startup speed ratio, the control device comprising: a speed change control valve which supplies the variable pulleys with the oil pressure; an actuator which drives the speed change control valve in accordance with a target speed ratio, and have a starting position of which is set at a position in which a speed ratio of the continuously variable transmission reaches a biggest speed ratio; a controller for controlling the speed ratio via the actuator; a shift lever position detecting switch for detecting a position of a shift lever of the continuously variable transmission; and a primary side pulley rotation speed sensor for detecting a rotation speed of the primary side pulley; wherein the controller switches the speed ratio from the second speed ratio to the first speed ratio, when the shift lever position of the continuously variable transmission is in a position for selecting the second speed ratio, vehicle deceleration is underway, and the rotation speed of the primary side pulley falls to a predetermined rotation speed; switches the speed ratio from the first speed ratio to the second speed ratio, when the shift lever position of the continuously variable transmission is in a position for selecting the second speed ratio, vehicle startup is underway, and the rotation speed of the primary side pulley rises to the predetermined rotation speed; and controls the actuator in accordance with the switched speed ratio. When the rotation speed of the primary side pulley falls to or below the predetermined rotation speed, the speed ratio is switched to the first speed ratio, at which the actuator reaches the starting position, even if the second speed ratio has been selected, and as a result, speed change control during startup can be performed with a high level of precision.

This invention is not limited to the embodiment described above, and may be modified in various ways within the technical scope of the invention. This application claims priority from Japanese Patent Application 2006-031104, filed Feb. 8, 2006, which is incorporated herein by reference in its entirety.

What is claimed is:

1. A control device for a continuously variable transmission,
    the continuously variable transmission having a pair of variable pulleys constituted by a primary side pulley and a secondary side pulley, in which a contact pulley width of a V belt is variably controlled on the basis of an oil pressure, and a first speed ratio corresponding to a biggest speed ratio and a second speed ratio that is smaller than the first speed ratio as a startup speed ratio,
    the control device comprising:
    a speed change control valve which supplies the variable pulleys with the oil pressure;
    an actuator which drives the speed change control valve in accordance with a target speed ratio, and have a starting position of which is set at a position in which a speed ratio of the continuously variable transmission reaches the biggest speed ratio;
    a controller for controlling the speed ratio via the actuator;
    a shift lever position detecting switch for detecting a position of a shift lever of the continuously variable transmission; and
    a primary side pulley rotation speed sensor for detecting a rotation speed of the primary side pulley;
    wherein the controller
    switches the speed ratio from the second speed ratio to the first speed ratio, when the shift lever position of the continuously variable transmission is in a position for selecting the second speed ratio, vehicle deceleration is underway, and the rotation speed of the primary side pulley falls to a predetermined rotation speed;
    switches the speed ratio from the first speed ratio to the second speed ratio, when the shift lever position of the continuously variable transmission is in a position for selecting the second speed ratio, vehicle startup is underway, and the rotation speed of the primary side pulley rises to the predetermined rotation speed; and
    controls the actuator in accordance with the switched speed ratio.

2. The control device for the continuously variable transmission as defined in claim 1, further an engine transmitting torque to the continuously variable transmission;
    wherein the controller reduces an output torque of the engine generated during running at the first speed ratio until the rotation speed of the primary side pulley rises to the predetermined rotation speed, when the shift lever position of the continuously variable transmission is in a position for selecting the second speed ratio and vehicle startup is underway.

3. The control device for the continuously variable transmission as defined in claim 2, wherein the controller reduces the output torque of the engine in accordance with a ratio between the first speed ratio and the second speed ratio such that a driving force generated during running at the first speed ratio becomes equal to a driving force generated during running at the second speed ratio.

4. A control method for a continuously variable transmission,
    the continuously variable transmission having a pair of variable pulleys constituted by a primary side pulley and a secondary side pulley, in which a contact pulley width of a V belt is variably controlled on the basis of an oil pressure, a first speed ratio corresponding to a biggest speed ratio and a second speed ratio that is smaller than the first speed ratio as a startup speed ratio; and
    an actuator which drives a speed change control valve in accordance with a target speed ratio, has a starting position of which is set at a position in which a speed ratio of the continuously variable transmission reaches the biggest speed ratio;
    the control method comprising:
    switching the speed ratio from the second speed ratio to the first speed ratio, when the shift lever position of the continuously variable transmission is in a position for selecting the second speed ratio, vehicle deceleration is underway, and the rotation speed of the primary side pulley falls to a predetermined rotation speed;
    switching the speed ratio from the first speed ratio to the second speed ratio, when the shift lever position of the continuously variable transmission is in a position for selecting the second speed ratio, vehicle startup is underway, and the rotation speed of the primary side pulley rises to the predetermined rotation speed; and
    controlling the actuator in accordance with the switched speed ratio.

5. The control method for the continuously variable transmission as defined in claim 4, further an engine transmitting torque to the continuously variable transmission;
    the control method further comprising:
    reducing an output torque of the engine generated during running at the first speed ratio until the rotation speed of the primary side pulley rises to the predetermined rotation speed, when the shift lever position of the continuously variable transmission is in a position for selecting the second speed ratio and vehicle startup is underway.

6. The control method for the continuously variable transmission as defined in claim 5, the control method further comprising:
    reducing the output torque of the engine in accordance with a ratio between the first speed ratio and the second speed ratio such that a driving force generated during running at the first speed ratio becomes equal to a driving force generated during running at the second speed ratio.

7. A control device for a continuously variable transmission,
    the continuously variable transmission having a pair of variable pulleys constituted by a primary side pulley and a secondary side pulley, in which a contact pulley width of a V belt is variably controlled on the basis of an oil pressure, and a first speed ratio corresponding to a biggest speed ratio and a second speed ratio that is smaller than the first speed ratio as a startup speed ratio, the control device comprising:

a speed change control valve which supplies the variable pulleys with the oil pressure;

an actuator which drives the speed change control valve in accordance with a target speed ratio, and have a starting position of which is set at a position in which a speed ratio of the continuously variable transmission reaches the biggest speed ratio;

means for controlling the speed ratio via the actuator;

means for detecting a position of a shift lever of the continuously variable transmission;

means for detecting a rotation speed of the primary side pulley;

means for switching the speed ratio from the second speed ratio to the first speed ratio, when the shift lever position of the continuously variable transmission is in a position for selecting the second speed ratio, vehicle deceleration is underway, and the rotation speed of the primary side pulley falls to a predetermined rotation speed;

means for switching the speed ratio from the first speed ratio to the second speed ratio, when the shift lever position of the continuously variable transmission is in a position for selecting the second speed ratio, vehicle startup is underway, and the rotation speed of the primary side pulley rises to the predetermined rotation speed; and means for controlling the actuator in accordance with the switched speed ratio.

8. The control device for the continuously variable transmission as defined in claim 7, further an engine transmitting torque to the continuously variable transmission, the control device further comprising:

means for reducing an output torque of the engine generated during running at the first speed ratio until the rotation speed of the primary side pulley rises to the predetermined rotation speed, when the shift lever position of the continuously variable transmission is in a position for selecting the second speed ratio and vehicle startup is underway.

9. The control device for the continuously variable transmission as defined in claim 8, the control device further comprising:

means for reducing the output torque of the engine in accordance with a ratio between the first speed ratio and the second speed ratio such that a driving force generated during running at the first speed ratio becomes equal to a driving force generated during running at the second speed ratio.

\* \* \* \* \*